Dec. 2, 1941.　　　A. D. OLDS　　　2,264,547
FLOOR FURNACE
Filed Sept. 23, 1939　　　2 Sheets-Sheet 1

INVENTOR
Ambrose D. Olds.
BY Arthur C. Brown
ATTORNEY

Dec. 2, 1941.  A. D. OLDS  2,264,547
FLOOR FURNACE
Filed Sept. 23, 1939  2 Sheets-Sheet 2
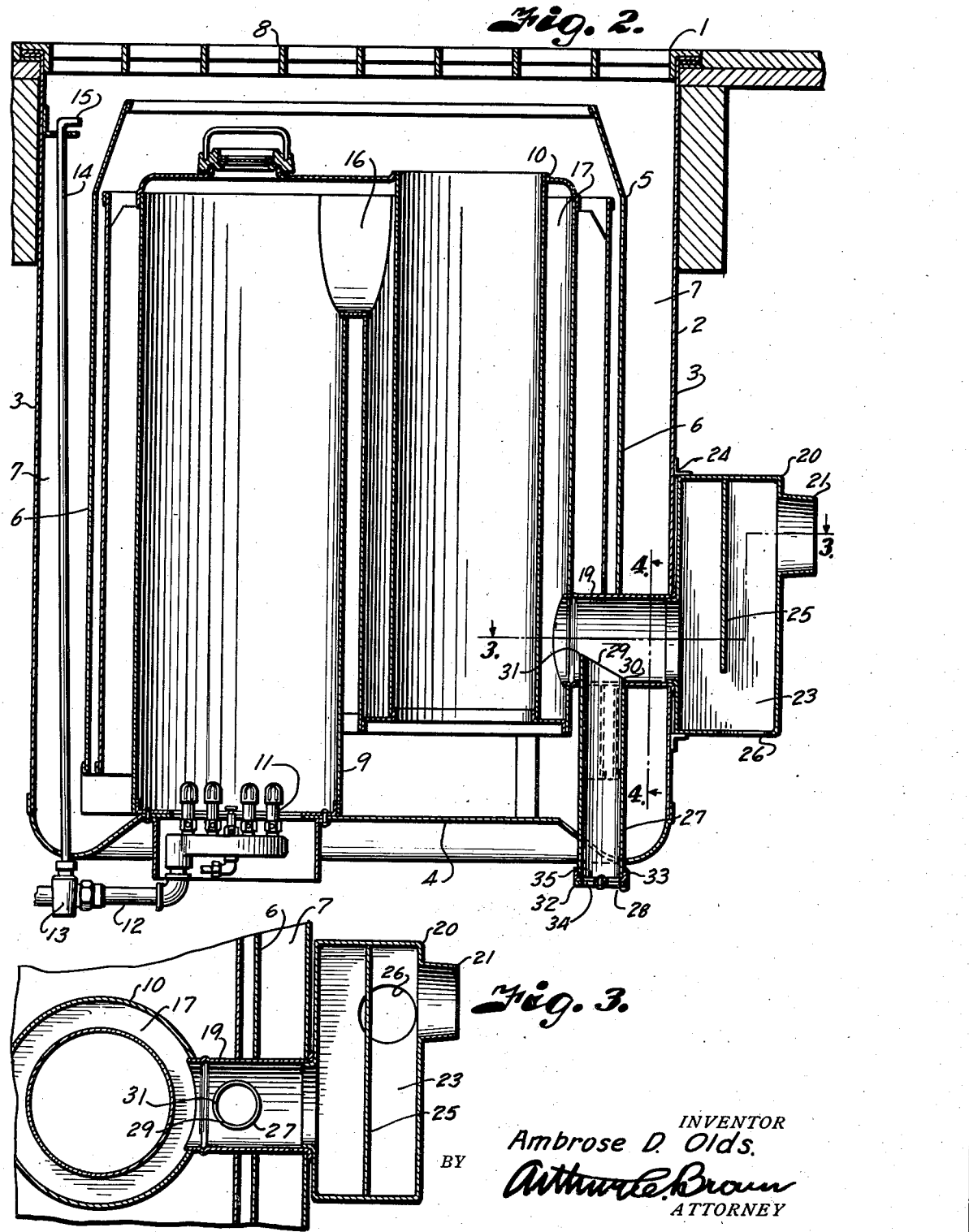
INVENTOR
Ambrose D. Olds.
BY
Arthur E. Brown
ATTORNEY Patented Dec. 2, 1941

2,264,547

UNITED STATES PATENT OFFICE 2,264,547

FLOOR FURNACE

Ambrose D. Olds, Wichita, Kans., assignor to The Coleman Lamp and Stove Company, Wichita, Kans., a corporation of Kansas Application September 23, 1939, Serial No. 296,282

1 Claim. (Cl. 126—116)

This invention relates to furnaces, particularly those of the character known as floor furnaces wherein the furnace is set in a floor opening with the body portion thereof suspended below the floor structure.

Furnaces of this character are especially designed for occupying a minimum space and consequently the heating efficiency is compromised to permit such installation. The stack temperatures are therefore higher than desirable, particularly having in mind the requirements of safety, since the flue gas carrying parts are in close proximity or in contact with the floor joists and other supporting members of combustible nature of the house structure.

It is, therefore, the principal object of the present invention to provide a floor furnace with means for admitting cool air into the spent products of combustion prior to discharge thereof from the furnace, thereby maintaining lower temperature in the gas carrying parts which extend in close proximity to the combustible members of the house structure.

Other objects of the invention are to provide a floor furnace with flue gas temperature reducing means so located as to prevent overheating of the furnace jacket incidental to heat conducted from the flue gas carrying parts; and to provide means for controlling admission of cool air to maintain a predetermined flue gas temperature.

In accomplishing these and other objects of the invention, I have provided improved details of structure, the preferred forms of which are illustrated in the accompanying drawings, wherein:

Fig. 2 is an enlarged vertical section through the floor furnace and the adjacent parts of the floor structure.

Fig. 3 is a horizontal section on the line 3—3 of Fig. 2.

Figure 1:
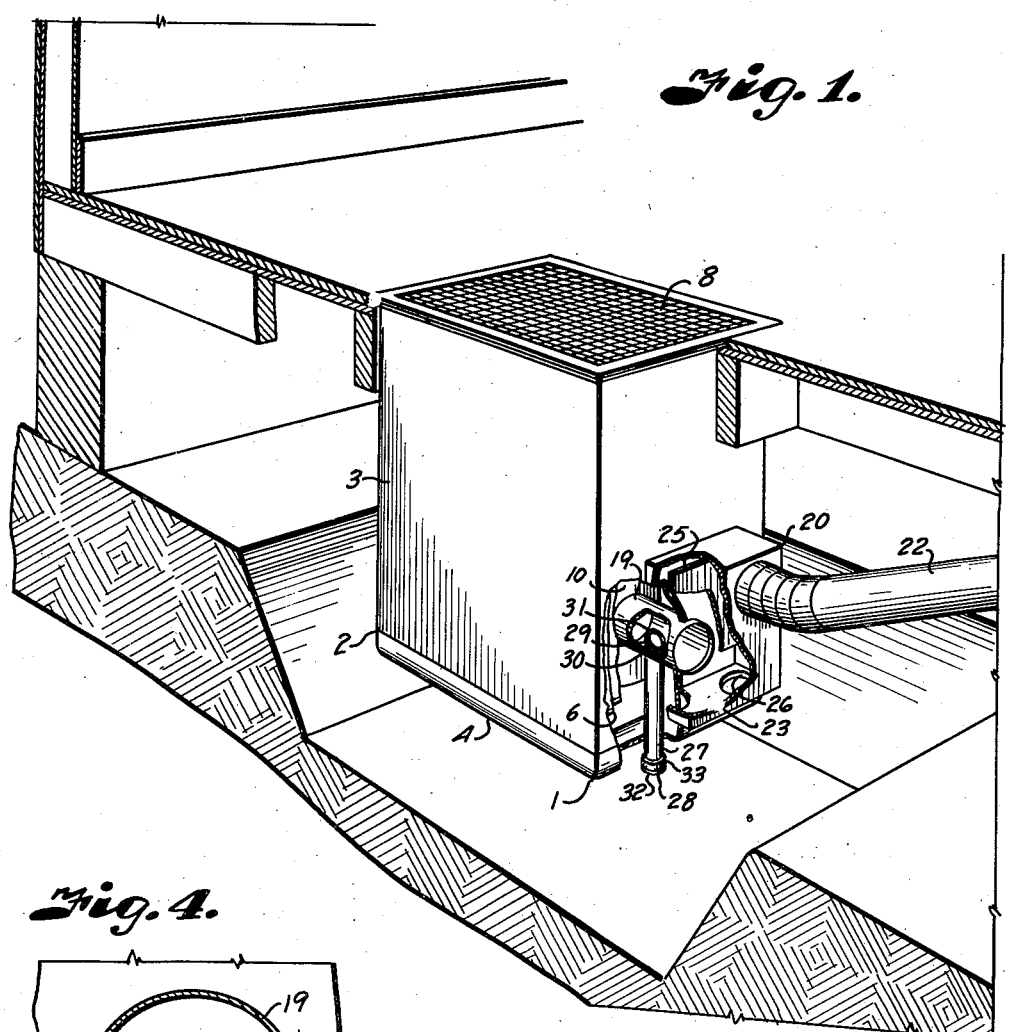
Fig. 1 is a perspective section through a portion of a building equipped with a floor furnace embodying the present invention.
Figure 4:
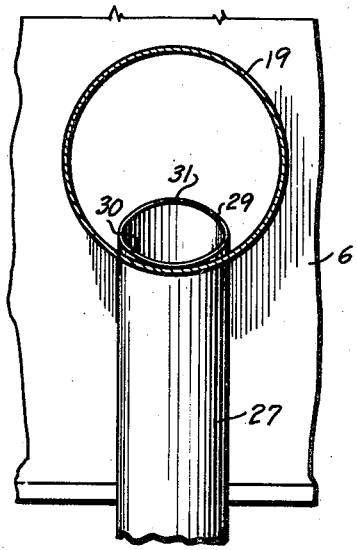
Fig. 4 is a detail vertical section on the line 4—4 of Fig. 2.
Figure 5:
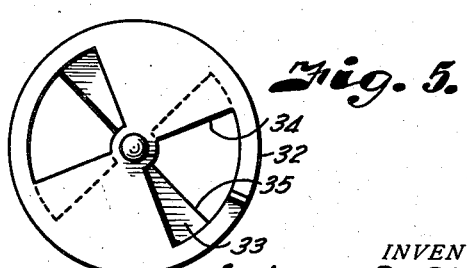
Fig. 5 is an end elevational view of the damper for controlling inlet of cool air through the injector tube.

Referring more in detail to the drawings:

1 designates a floor furnace constructed in accordance with the present invention and which includes an outer casing 2 having side walls 3 and a bottom 4. Supported within the casing 2 is an inner casing 5, having side walls 6 spaced from the walls 3 to form downwardly directed passageways 7 for the admission of air to be heated into the furnace through a grill 8 covering the open top of the casing 2. The lower edges of the side walls of the inner casing terminate short of the bottom 4 so that the air to be heated is directed upwardly through the interior of the inner casing and in contact with the heating drum 9 and radiator unit 10 that is connected therewith.

Supported in the bottom of the heating drum 9 is a burner 11, which is supplied with gas or similar fuel through a pipe 12 under control of a regulating valve 13, the valve 13 being operated by a stem 14 extending upwardly within the casing and having the upper end terminating in a lateral lever arm 15 to which access may be had upon removal of the grill 8. The products of combustion resulting from actuation of the burner pass upwardly through the heating drum and are discharged through a connection 16 into the upper portion of the radiator unit.

The radiator unit includes inner and outer shells of size to provide a passageway 17 therebetween for the products of combustion, and a central passageway 18 for a part of the room air admitted into the furnace. Connected with the lower portion of the heating drum is an outlet duct 19 opening through a side wall 3 of the outer casing 2 to connect with a draft diverter 20 which in turn is connected by a collar 21 with a vent pipe 22 leading to a flue or chimney (not shown).

In the furnace illustrated the gas diverter comprises a substantially box-like chamber 23 carried from the side wall 3 by brackets 24, as clearly shown in Fig. 2. The interior of the chamber is divided by a baffle 25 depending downwardly between the duct 19 and gas outlet collar 21, but terminating short of the bottom of the chamber to permit passage of the flue gas thereunder. The baffle 25 retards flow of the flue gases from the furnace and avoids drawing of heat by suction incidental to draft through the chimney to which the furnace is connected. The bottom of the diverter chamber is provided with an air inlet opening 26 for further checking draft through the furnace.

Owing to the limited space in which floor furnaces must be installed, the radiating surfaces thereof are relatively small and are insufficient to effect absorption of all the generated heat, with the result that the flue gases passing into the diverter are relatively high in temperature, which is often so high that the top of the diverter and vent pipe are heated to the danger point and apt to cause combustion of wooden parts of the house structure that are in close proximity therewith.

It is true that air is drawn through the check draft opening 26, but this air passes directly on the vent outlet side of the baffle and has little opportunity of mixing with the hot gases on the furnace side of the baffle, so that it has no effect in reducing temperature of the top portion of the draft diverter. Since the outlet duct 19 must be directly connected with the casing 2, the heat of the gases flowing therethrough is readily conducted through the wall of the casing to the combustible parts of the house structure with which the furnace may be associated. In this instance any air admitted through the check draft opening has no effect in reducing the temperature of the casing.

In overcoming these difficulties I have provided means for admitting cool air from the basement or pit in which the furnace is suspended. This is effected by providing an induction tube 27 having an inlet 28 located exteriorly of the furnace jacket and an outlet 29 projecting into the duct 19 at a point within the furnace casing 2. In order to admit the cooler air or the air circulating close to the bottom of the pit or floor, the induction tube is preferably arranged in a vertical position with the inlet end extending downwardly through the bottom of the casing, while the outlet end projects into the duct 19 and in path of the hot gases so that the velocity thereof is effective in inducing flow of cool air into admixture therewith and directly within the duct 19 so that when the gases pass the furnace casing 2 they are sufficiently cooled to maintain the diverter and adjacent parts of the furnace structure, as well as the vent pipe, at low temperature, thereby avoiding the hazards above noted.

In order to enhance the inducting action of the hot gases, the outlet end of the tube is formed on a bias, as indicated at 30, whereby the side edge 31 adjacent the inlet of the duct 19 projects above the opposite side so that flow of air through the induction tube is not interfered with by flow of hot gases. In some instances it may be desirable to control the amount of air admitted by way of the induction tube. This may be effected by providing the inlet end of the tube with a damper 32 which, in the present instance, is illustrated as a plate rotatably attached to a cap 33 carried by the end of the tube and having sector-shaped openings 34 adapted to be registered with corresponding shaped openings 35 in the cap.

From the foregoing it is obvious that I have provided a simple and inexpensive means for effectively reducing temperature of the products of combbustion before they are passed into the draft diverter and vent pipe, thereby avoiding overheating of these parts which are apt to be in close proximity to or in contact with the combustible parts of a building structure in which a floor furnace may be installed.

What I claim and desire to secure by Letters Patent is:

In a furnace of the character described, an outer casing having side and bottom walls, an inner casing having side walls spaced from the side walls of the outer casing, a heating unit enclosed in the inner casing and having a hot gas passage closed at the bottom and spaced above the bottom of the outer casing, said passage having a lateral opening above said closed bottom, conducting means connected with said lateral opening and extending laterally through the walls of said casings, and cool air inducing means having an air inlet end extending through the bottom of the casing and an outlet end connected with said conducting means substantially at the point where the conducting means extends through the wall of said inner casing.

AMBROSE D. OLDS.